(Model.)

W. P. PRALL.
HORSE HAY RAKE.

3 Sheets—Sheet 1.

No. 333,084. Patented Dec. 22, 1885.

Witnesses:
Inventor
Walter P. Prall.
By Wm. M. Cuthbert.
Attorney (Model.)

3 Sheets—Sheet 2.

W. P. PRALL.
HORSE HAY RAKE.

No. 333,084. Patented Dec. 22, 1885.

Witnesses:
A. B. Dodge
Leonard Peloubet

Inventor.
Walter P. Prall
By Wm. M. Cuthbert
Attorney.

(Model.)

3 Sheets—Sheet 3.

W. P. PRALL.
HORSE HAY RAKE.

No. 333,084.　　　　　　　　　　Patented Dec. 22, 1885.

Fig. 4.

Witnesses:
A. R. Dodge.
Leonard Pelouber

Inventor,
Walter P. Prall.

By Wm. M. Cuthbert,
Attorney.

N. PETERS, Photo-Lithographer, Washington, D. C.

UNITED STATES PATENT OFFICE.

WALTER P. PRALL, OF WOODBRIDGE, NEW JERSEY.

HORSE HAY-RAKE.

SPECIFICATION forming part of Letters Patent No. 333,084, dated December 22, 1885.

Application filed March 27, 1885. Serial No. 160,397. (Model.)

*To all whom it may concern:*

Be it known that I, WALTER P. PRALL, a citizen of the United States, residing at Woodbridge, in the county of Middlesex and State of New Jersey, have invented a new and useful Horse Hay-Rake, of which the following is a specification.

My invention relates to improvements in horse hay-rakes, in which the rake can be raised from the ground by the driver so as to dump the hay at the same time the rake-teeth are cleaned by a cleaner.

The objects of my invention are simplicity, durability, and ease of operation of the rake, also to utilize the power of the horse to hold the rake-teeth down with increasing force as the rake becomes loaded, and to clean the teeth from the under side. I attain these objects by the mechanism hereinafter described, and illustrated in the accompanying drawings, in which—

Figure 1:
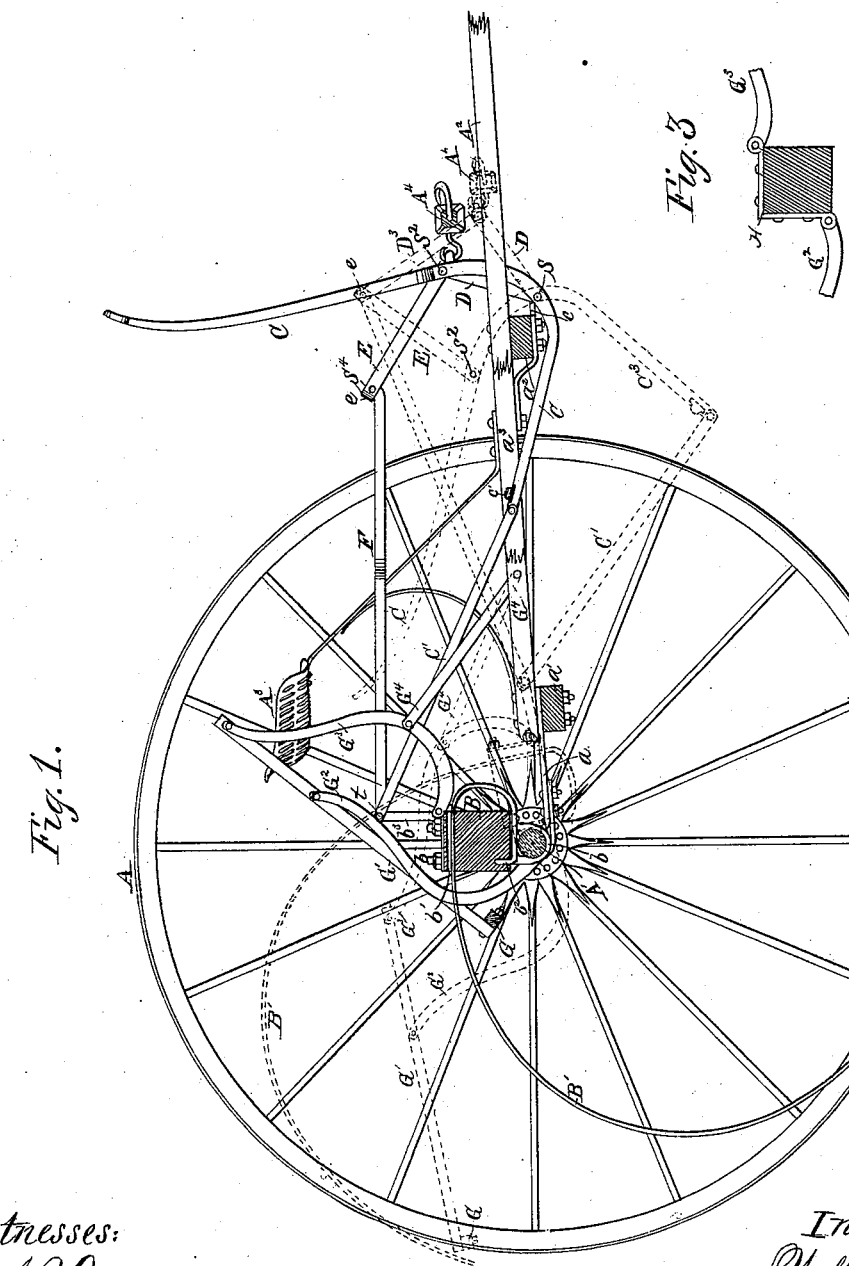
Figure 2:
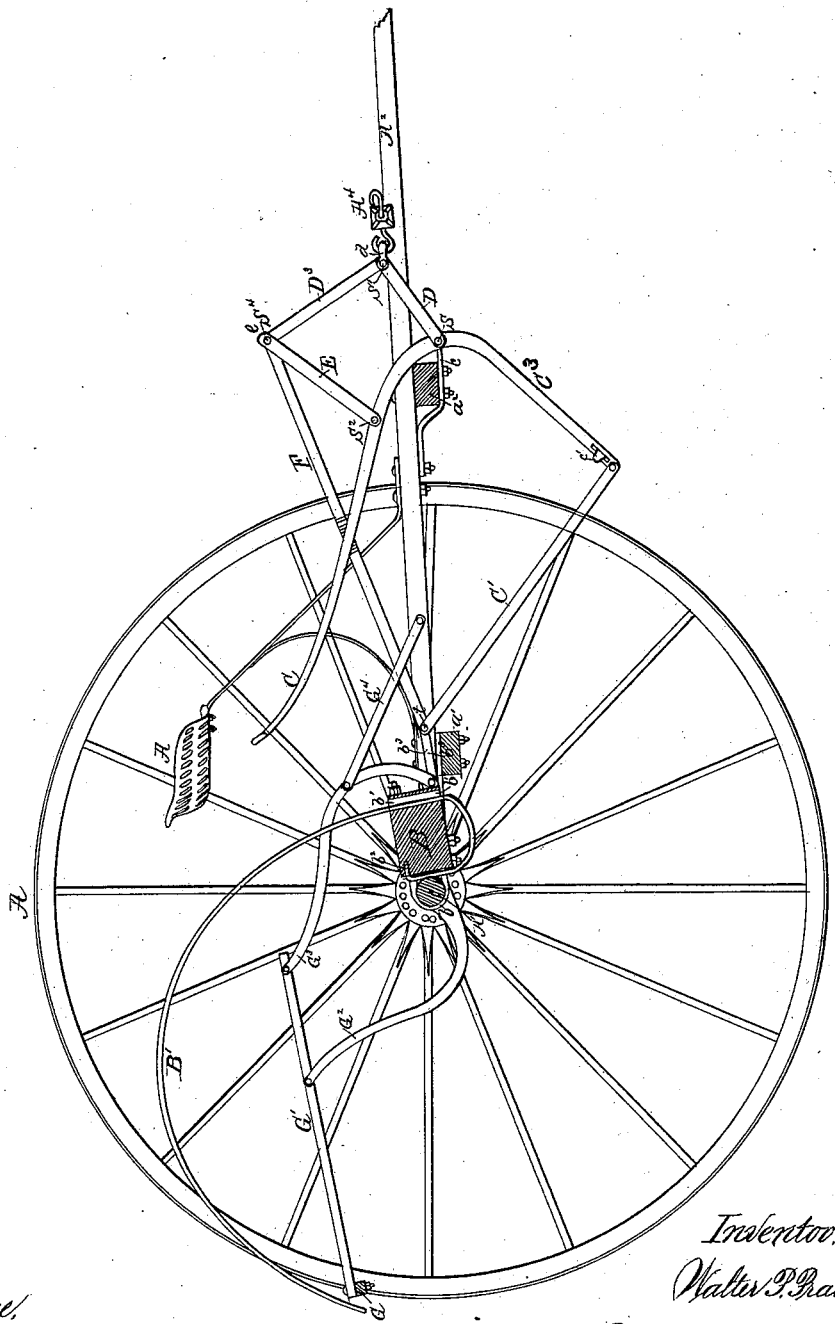

Figure 1 is a side elevation, one of the traveling-wheels being removed, and the rake being shown down or in a working position by the true lines. Fig. 2 is a similar view, but shows the rake raised and the cleaner extended to the end of the teeth. Fig. 3 is a cross-section of the rake-head, and illustrates another way of attaching the cleaner-supports $G^2$ $G^3$, as hereinafter set forth. Fig. 4 is a plan view of the invention, the rake-teeth down, as shown in Fig. 1.

Similar letters of reference refer to like parts in all the views.

A is one of the traveling-wheels; A′, the axle; B, the rake-head, which is a bar of wood placed on the top of the axle, to which it is permanently secured by three or more screw-headed staples, $b$, which pass around the axle, the free ends then passing through holes provided in the bar B and secured by nuts.

B′ are the rake-teeth, which are curved in the usual way, as shown, and are secured in the head B by their free ends being first passed through the mortises $b'$ in the head B. Said mortises are a little larger vertically than the diameter of the teeth, so that they are free to move up and down in them. The upper ends of the teeth, being drawn to the front of the bar B, are bent down in a short curve, and pass under the head or bar B and between it and the axle. They then have their ends turned up, as at $b^2$, so as to enter the under side of the bar near its back. They are held in place by the axle A′, which acts as a clamp.

$A^2$ is one of the thills, partly broken away. It is attached to the axle by a strap, $a$, bolted to it at its rear end, from which it passes back and is secured to the axle A′.

$A^3$ is the driver's seat, made and attached to the rake in the usual way.

$a'$ and $a^2$ are cross-bars which extend across from one thill to the other.

$a^3$ is a short bar which extends centrally of the machine from bar $a'$ to bar $a^2$. It gives attachment for the seat $A^3$, and at the front end in connection with bar $a^2$ for the lever-journal or fulcrum-box $c$.

The mechanism for raising the rake consists of a series of toggles combined. The lever C forms the hand-lever, and all of that part of it below and including the pivot-joint $S^2$ has also the function of a toggle-link, this part of the lever being marked $C^3$. It is slightly curved on its front or face, and just above the cross-bar $a^2$ it is bent laterally next to bar $a^3$, and at the side of this bar it is again bent, so as to pass down and curve under bar $a^2$; thence it extends back, toward the axle. It has its fulcrum in box $c$, to which it is pivoted. At its lower end it connects by a pivot to rod C′, which is a straight connecting-rod that extends and is connected by a pivot, $t$, to a short standard, $b^3$, on the rake-head B.

$c'$ is a foot-rest which projects to the right from lever C just in front of its connection with bar C′. In front of this foot-rest and on the left side of lever C, and securely attached to it, is an arm or branch, $C^2$, which has the same contour as seen from one side as that part of lever C as far as a point just below the lateral bend of lever C where it terminates. This branch $C^2$ of lever C has its fulcrum in box $c$, but at the left or opposite side from that of the fulcrum of lever C, from which it is separated by the box $c$. It moves on the same pivot, $s$, as lever C, which passes through said box. Pivoted at their ends to the box $c$ are a pair of short toggle-links, D $D^2$, which extend toward the front. They are connected to the box $c$ by the same pivot, $s$, that forms the fulcrum of lever C $C^2$, and at their front ends to a clevis, $d$, to which is attached the single-tree $A^4$ by a bolt or pivot, $s'$, and also by the same pivot or bolt to a short straight toggle-link, D³, which extends up, and connects to the end of a long connecting-rod, F, hereinafter described.

E and E' are the two sides of a toggle-link formed from a single strap or bar of iron, which is bent into the shape of an inverted V. Their free ends are pivoted at s² and s³, the one, E, to the left side of lever C at a point just below its lateral bend, and the other, E', to the free end of the branch C² of lever C. At the upper end, just below their bent connection, they are connected by the pivot s⁴ to the front end of the long rod F, so that when the rake is raised the bent part e of the link has a bearing on the upper edge of rod F. Said rod F is slightly bent sidewise so as to clear the driver's seat, and connects by its rear end to the upper end of the standard b³ by the pivot t, which connects the connecting-rod C' of the lever C to the said standard.

G is the cleaner. It consists of a light bar of wood which extends under the teeth a few inches back of the rake-head B and parallel with it. It is hung or attached securely to the ends of two light carrying-bars, G', which extend at right angles upward, and over the rake-head B. At about one-third of their length back from their upper ends they are connected by a pivot-connection to curved metal moving-supports G², which at their lower ends are connected to the axle A', so that they can turn on it. The axle forms the pivot of the head B, and it will turn in the wheel-hubs when the rake is raised or lowered in one direction, and the supports G² move in the opposite direction. The upper ends of bars G' are pivoted to the upper ends of curved levers G³, attached by hinge-joints to the front of the rake-head B. At about one-third of their length up from their lower ends they are connected by pivots to short rods or bars G⁴, which are attached by pivots to the inner sides of the thills, and thus form the fulcrums of levers G³, all of which is shown in Fig. 1.

H, Fig. 3, shows another way of connecting the support G² by the knee H, attached directly to the rake-head B, in which case the lower end of the knee gives a hinge-connection to the support. Of the two ways I believe the attaching it to the axle, as first described, and shown in Fig. 1 to be the better.

Operation: The rake being in the first position, as shown by the full lines in Figs. 1 and 2, it will be seen that the prime lever is the lever C. When it is desired to raise the rake from the ground for the purpose of dumping the load or other purpose, the foot of the operator is pressed down on the foot-rest c'. At the same time the hand-lever C is drawn back until the pivots s, s², and s⁴ come into line, when the draft or power of the horse is brought to bear on the toggle formed by the links D D² D³, so as to draw their connecting ends forward, whereupon link D³, by its connection with link E E' and rod F, draws their front ends down and forward, which action is conveyed to standard b³. At the same time the link E E' acts on lever C and its branch C², and forces their front ends back so as to depress the rear end of lever C, which motion is conveyed to standard b³ by the rod C'. The joint action of these rods C' and F, through standard b³, cause the rake-head B to make a quarter-revolution on its pivot—i.e., the axle—the rod F drawing the standard forward at the same time that rod C' draws it downward, until the pivot t of standard b³ comes into line with the pivots s² and s⁴, at which point it will be seen that the cleaner has moved out from its proximity to the head B to the extreme or free ends of the rake-teeth, in which movement it has followed the curve of the teeth, so as to sweep them from one end to the other, as hereinafter set forth. The machine is now in its second position, as shown by the dotted lines, into which position it has been brought by the draft of the horse, slightly assisted by the operator. In this position it is secured by a hook or similar device, which is attached to the cross-bar a', and turned so that it extends over and confines the standard b³ to said cross-bar, this being done only when the rake is out of use. When, however, the machine is being used, it is retained by the foot of the operator pressing on the foot-rest c', which holds the standard-pivot t below the direct draft-line with the pivot s'. When it is desired to lower the rake, the pressure of the foot is removed, lever C is thrown forward, thereby reversing all the movements above described, the lever C and rod C' pushing the standard b³ up and rod F forcing it back until the pivot s² is a little in advance of or in line with pivots s and s⁴, when the horse completes the change or sets the rake, these being the movements of the mechanism. The horse being attached to the toggle-joint D D² D³ must, when the rake is brought to its lowest position, exert more force, and thus hold the rake down to its work. At the same time said toggle does not become a lock-joint to prevent the rake from rising in the event of its coming into contact with an obstruction, for the reason that the bend e of link E E' on the rod F limits its movement.

The draft of the machine, it will be seen, is not upon the rake-head, but upon the axle of the machine through the medium of the toggle-links D' D², box c, cross-bars a a², and thill-straps a.

The bearing of the bend e on the top of the rod F, just back of the pivot s⁴, acts as a stop to limit the forward extension of the toggles when the rake-teeth are down, as shown in Fig. 1.

The operation of the cleaner mechanism is as follows: The machine being in the first position, (rake-teeth down,) as the rake-head B turns on its pivots it bears down on the short arm of the lever G³, which causes its long arm to move toward the rear, and the movable fulcrum-rod G⁴ to turn upward and forward about its pivot in the thill-frame until G⁴ and the long arm of lever G³ are (as it may be said) in line when said fulcrum-rod turns downward and backward, following the rear movement of the lever G³, which pushes the cleaner G backward. At the same time the curved supports of the bars G', to which the cleaner-bar is attached, guide the cleaner in its movement to the rear, so that it follows the curve of the teeth, and being under the teeth it forces the hay against them, so that it assists in brushing the teeth clean of any soft weeds or dead grass that may have gathered upon them. In lowering the rake the movements of the parts, as above described, are of course reversed, and the cleaner G is returned to its position in the rear of and near the rake-head B, as shown in Fig. 1.

When the pivots $s$, $s'$, $s^2$, $s^3$, and $s^4$ are in the same plane transversely of the machine, the mechanism is at what may be termed its "turning-point," or, in other words, if the joint pivots $s^2 s^3$ are advanced the rake will set for work, and when said joints are moved to the rear of this position the force of the horse will assist to raise the rake, dump the load, and clean the teeth, thus relieving the operator of much of the labor.

Should the rake-teeth come into contact with an obstruction, the rake-teeth act as levers on the rods F and C' and the toggles, and are permitted to rise so as to clear any such obstruction. Thus it will be seen that the toggles do not in any way act to lock the rake either up or down.

In raising the rake from its raking position, the rod C' is the principal connection, and the rod F acts as a key to the toggle-joints when they are in a horizontal line, and acting together to convey the draft of the horse to the machine, for as the lever C is drawn back the rod F raises the link E E' from its bearing on its top edge and moves its top part and also that of link D³, forward of the joint of the toggles C C² E E', D, D², and D³ moving back, yet still in line with C C² and E E'; but as soon as the link E E' passes to the rear of the line $s s^4$ the lock of the toggle-joints is opened, and the toggle-joint of D D² D³ ceases to move to the rear, but is drawn forward by the horse, and conveys his force through rod F and lever C C² and rod C' to the rake-standard $b$.

I claim—

1. The combination of the rake-head, standard $b^3$, rods F and C', toggle-links E E' D D² D³ C³ C², and the whiffletree, for the purpose of holding the rake down to its work.

2. The combination of the rake-head, standard $b^3$, rods F C', toggle-links E E' D D² D³ C² C³, and lever C, and the whiffletree for the purpose of raising or lowering the rake.

3. The combination of the rake-head, standard $b^3$, rods F and C', lever C, toggle-links C² C³ E E' D D² D³, and the bend or stop $e$, for the purpose of limiting the dropping of the rake-teeth.

4. The combination of the rake-head, standard $b^3$, links E E' D D² D³ C² C³, rods C' F, and lever C, for the purpose of operating the rake.

5. In a rake, the combination, of the toggle-joints C³ C² E E' and D D² D³, connecting-rods C' and F, fulcrum-box $c$, whiffletree A⁴, and the rake, as and for the purpose set forth.

6. In a rake, the combination of the toggle-joint C² C³ E E' and D D² D³, connecting-rods C' F, fulcrum-box $c$, whiffle tree A⁴, the rake-head, a cleaner provided with a cross-bar having its line of operation parallel to the curve of the rake-teeth, and connections, substantially as described, between the rake-head and cleaner.

7. In a rake, the combination of the toggle-joints C² C³ E E' and D D² D³, connecting-rods C' F, fulcrum-box $c$, whiffletree A⁴, the rake-head, a cleaner provided with a cross-bar hung under the rake-teeth, and having its line of operation parallel to the curve of the teeth, and connections, substantially as described, between the rake-head and the cleaner.

8. In a rake, the combination of the rake-head B, having the slots $b'$, rake-teeth B', passed through said slots and curved down and under said head, and provided with tenons $b^2$, extending up into the under side of the head, the axle A, having a bearing against the under side of the teeth, and the staples $b$, passed around the axle, through the head, and secured by nuts for the purpose of securing the teeth in the head.

9. In a rake, the rake-head B, cleaner G, carrying-bar G', moving support G², lever G³, moving fulcrum-bar G⁴, and thill A², all combined for the purpose of cleaning the teeth of the rake, substantially as described.

WALTER P. PRALL.

Witnesses:
JAMES P. PRALL,
DANIEL W. BROWN.